(12) United States Patent
Isono et al.

(10) Patent No.: US 7,907,362 B2
(45) Date of Patent: Mar. 15, 2011

(54) MAGNETIC DISK CONTROLLER AND METHOD

(75) Inventors: Soichi Isono, Kanagawa (JP); Minoru Tsukada, Kanagawa (JP); Tomoki Oura, Kanagawa (JP); Koji Takahashi, Kanagawa (JP)

(73) Assignee: Marvell International Ltd., Hamilton (BM)

( * ) Notice: Subject to any disclaimer, the term of this patent is extended or adjusted under 35 U.S.C. 154(b) by 392 days.

(21) Appl. No.: 12/012,426

(22) Filed: Feb. 1, 2008

(65) Prior Publication Data
US 2008/0253014 A1 Oct. 16, 2008

Related U.S. Application Data

(60) Provisional application No. 60/889,174, filed on Feb. 9, 2007.

(30) Foreign Application Priority Data

Feb. 1, 2007 (JP) ................................. 2007-023005

(51) Int. Cl.
*G11B 5/09* (2006.01)
(52) U.S. Cl. ............ 360/51; 360/49; 360/72.2; 714/769
(58) Field of Classification Search .................. None
See application file for complete search history.

(56) References Cited

U.S. PATENT DOCUMENTS

| | | | |
|---|---|---|---|
| 4,866,545 A | 9/1989 | LaManna et al. | |
| 4,900,168 A | 2/1990 | LaManna et al. | |
| 4,916,558 A | 4/1990 | Nishimura et al. | |
| 4,977,419 A | 12/1990 | Wash et al. | |
| 5,142,422 A | 8/1992 | Zook et al. | |
| 5,361,178 A | 11/1994 | Tanaka | |
| 5,432,613 A | 7/1995 | Lee | |
| 5,537,619 A | 7/1996 | Higurashi et al. | |
| 5,600,662 A * | 2/1997 | Zook ............................. | 714/769 |
| 5,818,653 A | 10/1998 | Park et al. | |
| 6,414,725 B1 | 7/2002 | Clarin et al. | |
| 6,467,060 B1 * | 10/2002 | Malakapalli et al. ......... | 714/758 |
| 6,950,269 B1 | 9/2005 | Johnson | |
| 7,120,738 B2 * | 10/2006 | Ninomiya et al. ............ | 711/113 |
| 7,286,714 B2 | 10/2007 | Bard et al. | |
| 7,468,682 B2 | 12/2008 | Altare | |
| 7,613,982 B2 * | 11/2009 | Kim et al. ..................... | 714/766 |
| 7,623,718 B2 | 11/2009 | Endo | |
| 7,624,328 B2 | 11/2009 | Unruh | |
| 7,639,443 B2 | 12/2009 | Isono et al. | |
| 2007/0220402 A1 | 9/2007 | Hagi et al. | |
| 2008/0141099 A1 | 6/2008 | Katoh et al. | |
| 2008/0186615 A1 | 8/2008 | Isono et al. | |
| 2008/0189590 A1 | 8/2008 | Isono et al. | |
| 2009/0031390 A1 | 1/2009 | Rajakarunanayake et al. | |

FOREIGN PATENT DOCUMENTS

JP 07-141113 2/1995

* cited by examiner

*Primary Examiner* — Jason C Olson

(57) ABSTRACT

Among other disclosed subject matter, a magnetic disk controller can include an index detecting unit to detect an index of the magnetic disk, an error check code generating unit to, after the index detecting unit detects the index, generate a first error check code for first write data based on the first write data and a first physical address of a first sector subsequent to the detected index, and a writing control unit to cause the first error check code generated by the error check code generating unit, the first write data and the first physical address to be written into a second sector subsequent to the first sector.

20 Claims, 9 Drawing Sheets

MAGNETIC DISK CONTROLLER AND METHOD

CROSS-REFERENCE TO RELATED APPLICATIONS

This application claims priority from Japanese patent application serial number 2007-023005, filed Feb. 1, 2007, and Provisional Application No. 60/889,174 filed Feb. 9, 2007, the entire contents of which are incorporated herein by reference.

TECHNICAL FIELD

The present invention relates to information storage.

BACKGROUND ART

A magnetic disk controller which, when reading data corresponding to each sector from a magnetic disk apparatus, transfers ID information regarding the sector before transferring the data of the sector has been proposed as, for example, in Japanese Patent Application publication No. 7-141113.

When writing data from a host into a magnetic disk, a magnetic disk controller obtains the address of a sector to which the data is to be written, and calculates an error check code based on the obtained address and the data to be written into the sector. Hence, the magnetic disk controller can not write the data and error check code into the sector immediately after obtaining the address of the sector. Accordingly, the magnetic disk controller keeps on hold the writing of the data and error check code until the sector comes back to the position of the magnetic head, which delays the writing of the data and error check code.

SUMMARY

The invention relates to information storage.

In a first aspect, a magnetic disk controller includes an index detecting unit that detects an index of a magnetic disk. The magnetic disk controller includes an error check code generating unit that, after the index detecting unit detects the index, generates a first error check code for a first write data based on the first write data and on a first physical address of a first sector subsequent to the detected index. The magnetic disk controller includes a writing control unit that causes the first error check code generated by the error check code generating unit, the first write data and the first physical address to be written into a second sector subsequent to the first sector.

Implementations can include any, all or none of the following features. The first sector can be adjacent to the detected index, and the second sector can be adjacent to the first sector on a side opposite from the detected index. The magnetic disk controller can include an address generating unit that sequentially generates a physical address of a sector in accordance with an elapsed time from when the index detecting unit detects the index, wherein the first physical address of the first sector is generated by the address generating unit. The error check code generating unit can further generate a second error check code for second write data based on the second write data and on a second physical address of the second sector which is generated by the address generating unit, and the writing control unit can further cause the second error check code generated by the error check code generating unit, the second write data and the second physical address to be written into a third sector subsequent to the second sector. The third sector can be adjacent to the second sector on a side opposite from the first sector. The magnetic disk controller can include an address obtaining unit to obtain a physical address representing a sector on which read data is stored; an address adding unit to add a predetermined value to the physical address obtained by the address obtaining unit; and a reading control unit to cause data to be read from a sector represented by a physical address generated as a result of the addition performed by the address adding unit. The predetermined value can be one.

In a second aspect, a method of controlling writing of data into a magnetic disk includes detecting an index of a magnetic disk. The method includes generating, after the index is detected, a first error check code for first write data based on first write data and on a first physical address of a first sector subsequent to the detected index. The method includes causing the generated first error check code, the first write data and the first physical address to be written into a second sector subsequent to the first sector.

Implementations can include any, all or none of the following features. The first sector can be adjacent to the detected index, and the second sector can be adjacent to the first sector on a side opposite from the detected index. The method can include sequentially generating the first physical address of the first sector in accordance with an elapsed time from when the index is detected. The method can include generating a second physical address of the second sector; generating a second error check code for second write data based on the second write data and on the second physical address of the second sector, and causing the second error check code, the second write data and the second physical address to be written into a third sector subsequent to the second sector. The third sector can be adjacent to the second sector on a side opposite from the first sector. The method can further include obtaining a physical address representing a sector on which read data is stored; adding a predetermined value to the obtained physical address to form a new physical address; and causing data to be read from a sector represented by the new physical address. The predetermined value can be one.

In a third aspect, a magnetic disk controller includes means for detecting an index of a magnetic disk. The magnetic disk controller includes means for generating, after the index is detected, a first error check code for first write data based on the first write data and on a first physical address of a first sector subsequent to the detected index. The magnetic disk controller includes means for causing the generated first error check code, the first write data and the first physical address to be written into a second sector subsequent to the first sector.

In a fourth aspect, a method includes determining a first physical address of a magnetic disk to which first data is to be written. The method includes generating a first error check code based on the first data and the first physical address. The method includes writing the first physical address, the first error check code and the first data to the magnetic disk substantially immediately after generating the first error check code.

Implementations can include any, all or none of the following features. The writing being performed substantially immediately can include that the writing is not kept on hold until a head of the magnetic disk returns to a previous position on the magnetic disk. The previous position can be where the head was located when the first error check code was generated. The first physical address can be associated with a first sector on the magnetic disk, and the first physical address, the first error check code and the first data can be written to a second sector on the magnetic disk associated with a second physical address. The method can include obtaining the first physical address as a location for reading the first data; converting the first physical address to the second physical address; and reading the first data from the second sector using the second physical address. The conversion can include adding a predetermined value to the first physical address.

DESCRIPTION OF EXEMPLARY EMBODIMENTS

Hereinafter, some embodiments will be described. The embodiments do not limit the scope of the invention according to the claims, and all the combinations of the features described in the embodiments are not necessarily essential.

Figure 1:
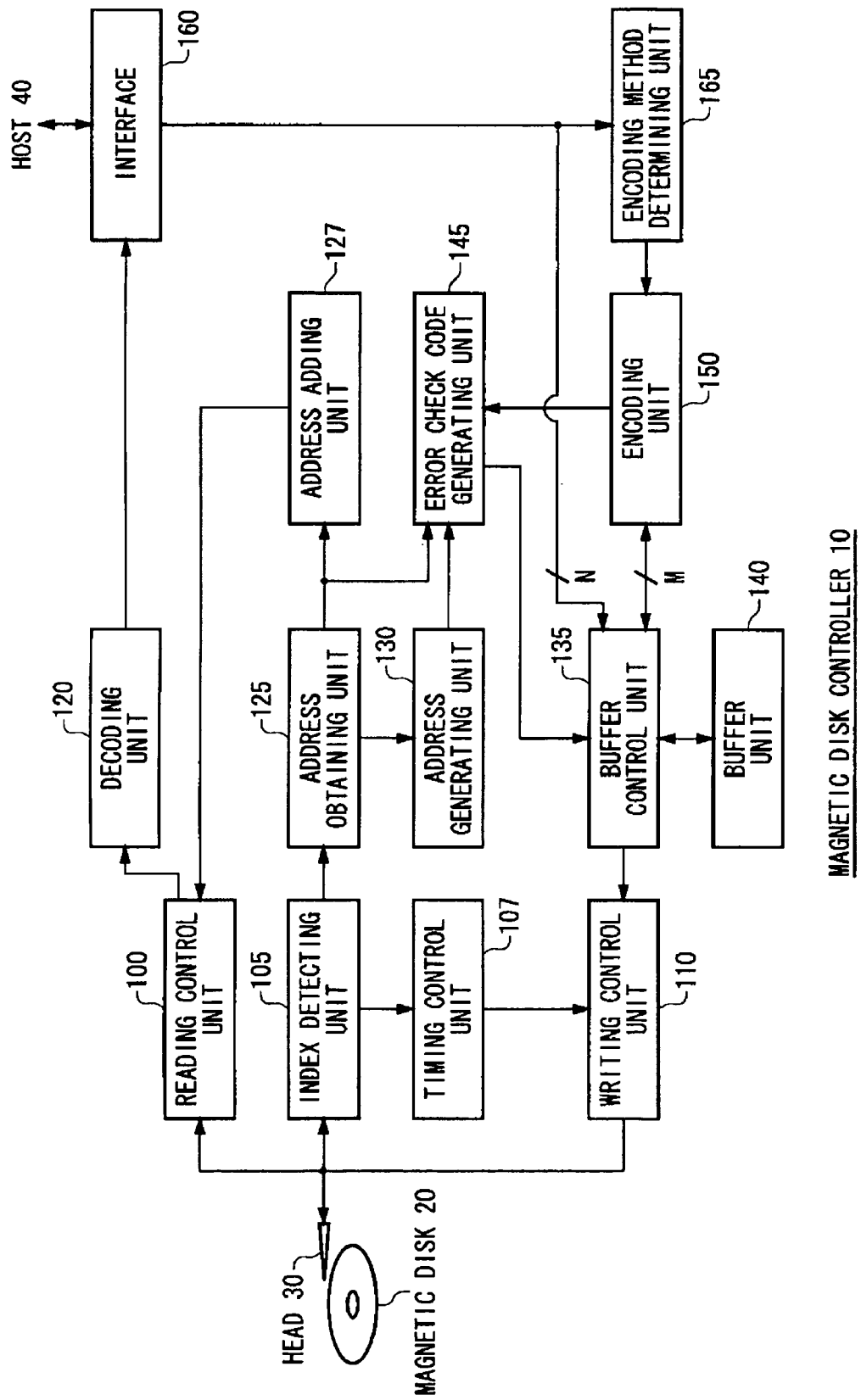
FIG. 1 is a block diagram showing a functional configuration of a magnetic disk controller 10.

FIG. 1 presents an example of an example functional configuration of a magnetic disk controller 10. The magnetic disk controller 10 here receives data from a host 40, and writes the data into a magnetic disk 20. In other words, the magnetic disk controller 10 controls writing of data performed via a head 30 into the magnetic disk 20. The host 40 can be a host computer, and can execute a predetermined command and data transmission/reception, for example by accessing a register group of a magnetic disk apparatus including therein the magnetic disk 20. The register group may include a control block register group and a command block register group.

An advantage of the magnetic disk controller 10 relating to the present embodiment is to write data and an error check code into a magnetic disk substantially immediately after generating the error check code based on the data.

The magnetic disk controller 10 in this example includes therein a reading control unit 100, an index detecting unit 105, a timing control unit 107, a writing control unit 110, a decoding unit 120, an address obtaining unit 125, an address adding unit 127, an address generating unit 130, a buffer control unit 135, a buffer unit 140, an error check code generating unit 145, an encoding unit 150, an interface 160, and an encoding method determining unit 165. It should be noted here that the magnetic disk 20 is a hard disk, for example.

The interface 160 transfers data to or from the magnetic disk 20. Specifically speaking, the interface 160 in some implementations receives, from the host 40, the data to be written into the magnetic disk 20, and transfers the data to the buffer control unit 135 and encoding method determining unit 165. Also, the interface 160 in some implementations receives data from the decoding unit 120, and transfers the data to the host 40. The index detecting unit 105 in some implementations detects, via the head 30, the index of the magnetic disk 20. The index detecting unit 105 in some implementations provides a signal representing a timing of the detection of the index to the address obtaining unit 125 and timing control unit 107.

In some implementations, the address generating unit 130 sequentially generates a physical address of a sector in accordance with a time period from the detection of the index by the index detecting unit 105. To be specific, the address generating unit 130 can receive, via the address obtaining unit 125, the signal representing the timing of the detection of the index from the index detecting unit 105, and sequentially generate a physical address of a sector in synchronization with the rotation of the magnetic disk 20. The address generating unit 130 can sequentially provide the generated physical address to the error check code generating unit 145. The address obtaining unit 125 can obtain a physical address on which reading data is stored. The address obtaining unit 125 can provide the obtained physical address to the address adding unit 127 and error check code generating unit 145. The address obtaining unit 125 can provide the signal representing the timing of the detection of the index, which can be received from the index detecting unit 105, to the address generating unit 130.

In some implementations, the error check code generating unit 145 generates a plurality of error check codes respectively for detecting errors of a plurality of pieces of write data. Specifically speaking, the error check code generating unit 145 can generate, after the index detecting unit 105 detects the index, a first error check code (CRC code) for first write data based on the first write data and a first physical address of a first sector subsequent to the detected index. Here, the error check code generating unit 145 may generate an error check code based on encoded data created by the encoding unit 150. The error check code generating unit 145 may generate, after the index detecting unit 105 detects the index, a first error correction code (ECC code) for the first write data based on the first write data and the first physical address of the first sector subsequent to the detected index.

The error check code generating unit 145 may generate the first error check code for the first write data based on the first write data and the first physical address of the first sector which is adjacent to the detected index. The error check code generating unit 145 may generate the first error check code for the first write data based on the first write data and the first physical address of the first sector which is generated by the address generating unit 130 in synchronization with the rotation of the magnetic disk 20. In addition, the error check code generating unit 145 can further generate a second error check code for second write data based on the second write data and a second physical address of a second sector which is generated by the address generating unit 130. The error check code generating unit 145 can provide a generated error check code and/or a generated error correction code to the buffer control unit 135.

In some implementations, the timing control unit 107 controls the timing at which the writing control unit 110 writes data into the magnetic disk 20, in accordance with the timing at which the index detecting unit 105 detects the index. The writing control unit 110 can write the data received from the buffer control unit 135 into the magnetic disk 20 via the head 30, at the timing controlled by the timing control unit 107. To be specific, the writing control unit 110 can control the head 30 so as to write the first error check code generated by the error check code generating unit 145, the first write data and the first physical address into a second sector subsequent to the first sector.

In some implementations, the writing control unit 110 causes the first error check code generated by the error check code generating unit 145, the first write data and the first physical address to be written into the second sector which is adjacent to the first sector on a side opposite from the index detected by the index detecting unit 105. The writing control unit 110 can cause the second error check code generated by the error check code generating unit 145, the second write data and the second physical address to be written into a third sector subsequent to the second sector. The writing control unit 110 can cause the second error check code generated by the error check code generating unit 145, the second write data and the second physical address to be written into the third sector which is adjacent to the second sector on a side opposite from the first sector.

In some implementations, the address adding unit 127 adds a predetermined value to the physical address obtained by the address obtaining unit 125. For example, the address adding unit 127 can add "1" to the physical address obtained by the address obtaining unit 125. When the error check code generating unit 145 requires a longer time period than a predetermined time period to generate an error correction code and/or an error check code, the address adding unit 127 may add an integer other than "1" (for example, integers larger than "1", such as "2" and/or "3") to the physical address obtained by the address obtaining unit 125. The address adding unit 127 can provide the result of the addition to the reading control unit 100. The reading control unit 100 can cause data to be read from a sector corresponding to the physical address generated by the address adding unit 127. The reading control unit 100 can provide the read data to the decoding unit 120. In other implementations, the address adding unit 127 can convert the physical address in another way, such as by subtraction, multiplication or division, or any other conversion operation.

In some implementations, the buffer unit 140 includes therein at least one buffer for temporarily storing data to be written into the magnetic disk 20. The buffer unit 140 can be controlled by the buffer control unit 135 so as to cause the at least one buffer to store temporarily the data to be written into the magnetic disk 20. The buffer unit 140 can provide the data stored on the buffer to the buffer control unit 135.

In some implementations, the buffer control unit 135 controls storing/reading data onto/from the buffer included in the buffer unit 140. The buffer control unit 135 can provide the data received from the buffer unit 140 to the encoding unit 150, and can cause the encoded data from the encoding unit 150 to be stored onto the buffer included in the buffer unit 140. The buffer control unit 135 can store the error check code generated by the error check code generating unit 145 onto the buffer included in the buffer unit 140. The buffer control unit 135 can read the data stored on the buffer included in the buffer unit 140, and can provide the read data to the writing control unit 110.

In some implementations, the encoding method determining unit 165 receives data to be written into the magnetic disk 20 from the interface 160, and determines an encoding method based on the received data. In some implementations, the encoding method determining unit 165 may transfer, to the encoding unit 150, the encoding method designated in advance by the user, independently from the data. The encoding method determining unit 165 can determine encoding methods to be used by the encoding unit 150 to encode a plurality of pieces of write data to be written into a plurality of sectors included in the magnetic disk 20, for example in such a manner that the encoding methods correspond to the pieces of write data in a one-to-one correspondence. In some implementations, the encoding method determining unit 165 can determine an appropriate encoding method by varying one or more of the factors including a minimum magnetization reversal interval, a maximum magnetization reversal interval, a bit length of original data and a bit length of encoded data, to name a few examples. For example, the encoding method determining unit 165 may choose an encoding method with the use of RLL codes. The encoding method determining unit 165 can provide information representing the determined encoding methods to the encoding unit 150.

In some implementations, the encoding unit 150 sequentially encodes the plurality of pieces of write data to be written into the plurality of sectors included in the magnetic disk 20 to create a plurality of pieces of data each representing a signal to be applied to the magnetic disk 20. For example, the encoding unit 150 can use the encoding method determined by the encoding method determining unit 165 in order to encode and thus convert the data (original data) received from the buffer control unit 135 into a different sequence of data that has a lower error rate than the original data. The encoding unit 150 can provide the encoded data to the buffer control unit 135 and error check code generating unit 145. The decoding unit 120 can decode the encoded data stored on the magnetic disk 20, which is received from the reading control unit 100, into the original data, and can provide the decoded data to the interface 160. In this example, the data width is M between the encoding unit 150 and buffer control unit 135, and the data width is N between the interface 160 and the buffer control unit 135, where the data width M may be equal to or larger than twice the data width N. In other implementations one or more other widths may be used.

The writing control unit 110 can write the error check code generated by the error check code generating unit 145 into the second sector subsequent to the first sector. In some implementations, this means that the error check code for the first sector is not stored on the first sector. The magnetic disk controller 10 may not need to hold the writing of the error check code for the first sector until the magnetic disk 20 rotates so that the first sector comes back to the head 30. As a consequence, the present embodiment can reduce a time period from when write data is obtained to when the error check code is written into the magnetic disk 20.

Figure 2:
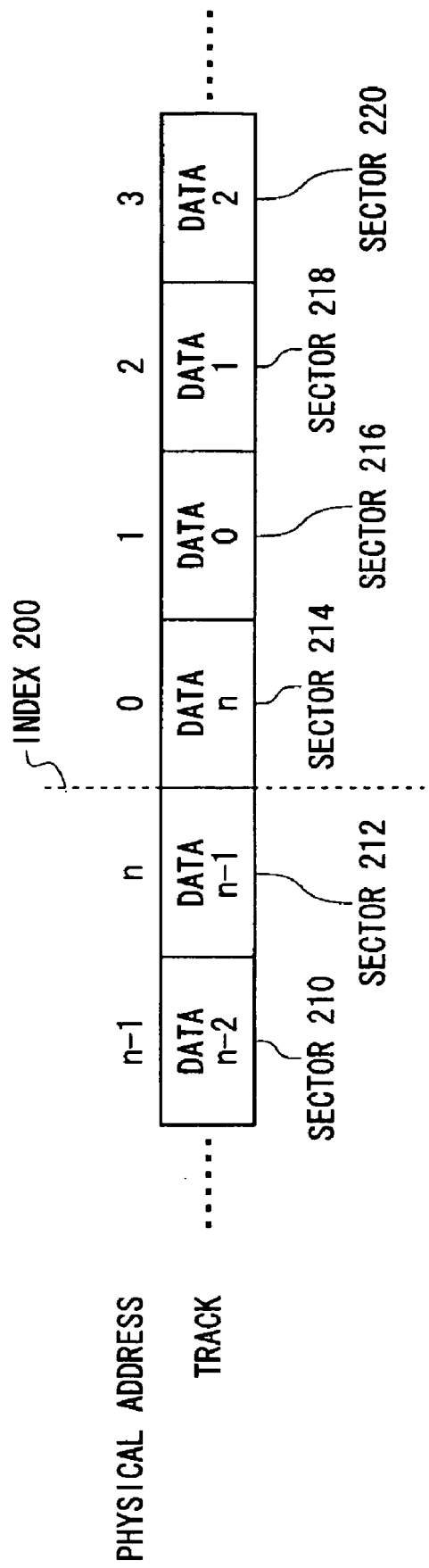
FIG. 2 shows writing of data into a magnetic disk 20.

FIG. 2 shows, as an example, writing of data into the magnetic disk 20 that can be performed by the magnetic disk controller 10. The magnetic disk controller 10 can store the first error check code for the first write data, which can be generated based on the first write data and the first physical address (e.g. physical address "0") of the first sector (e.g. the sector 214 associated with the physical address "0") subsequent to the index 200 detected by the index detecting unit 105, onto the sector 216 associated with the physical address "1" which follows the first sector. The magnetic disk controller 10 can write the first physical address and the first write data of the first sector 214 onto the sector 216 following the first sector 214.

In some implementations, the magnetic disk controller 10 may write the first error check code, first write data and first physical address, not into the sector 216 which immediately follows the first sector (e.g. sector 214), but into a sector (e.g. sector 220) which follows the sector 214 with a predetermined number of sectors therebetween. In the same manner, the magnetic disk controller 10 stores data in terms of the sectors 210, 212, 216, 218 and 220.

Figure 3:
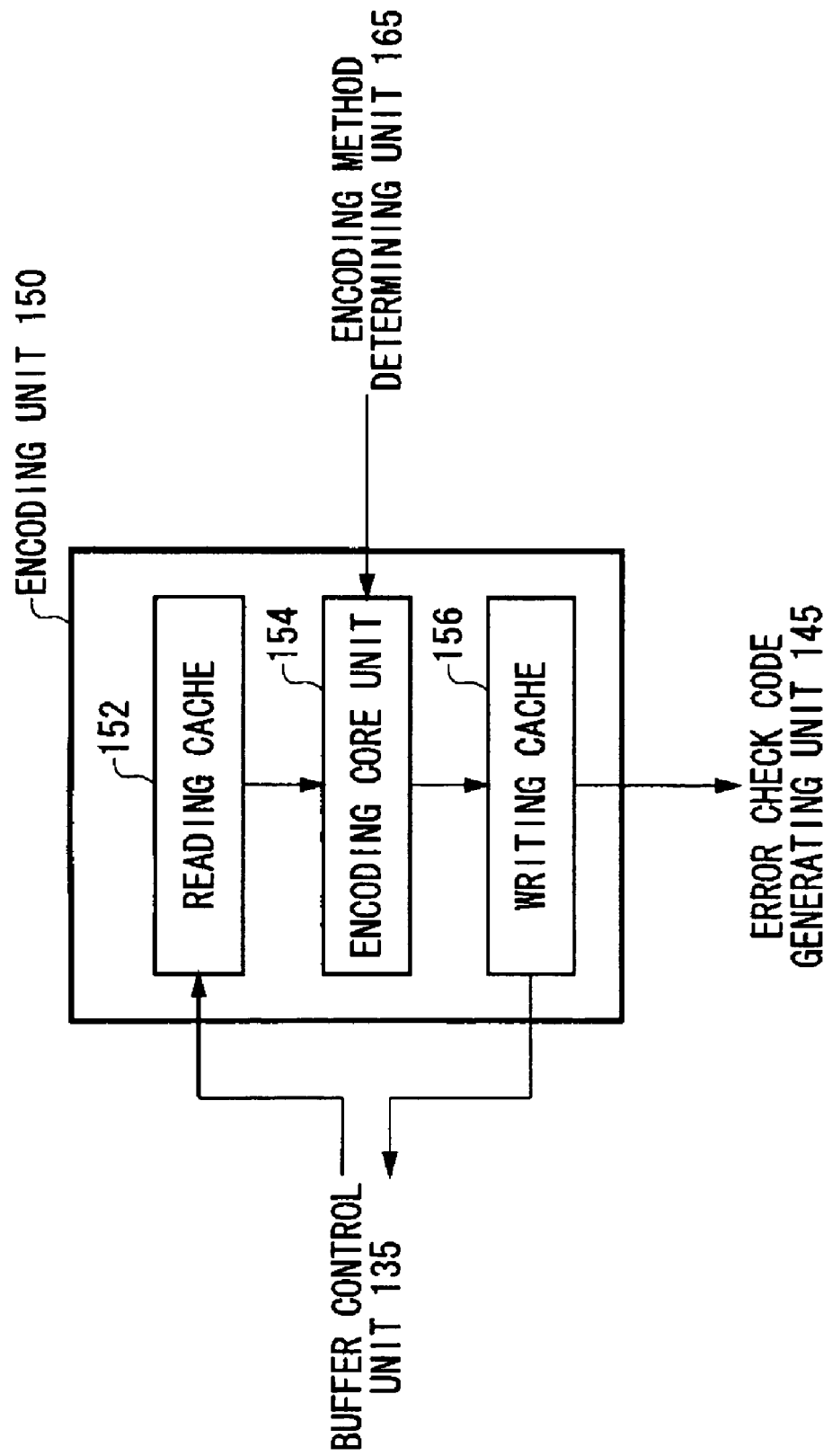
FIG. 3 is a block diagram showing a functional configuration of an encoding unit 150.

FIG. 3 shows an example of a functional configuration of the encoding unit 150. The encoding unit 150 here includes therein a reading cache 152, an encoding core unit 154 and a writing cache 156. The reading cache 152 can read the data stored on the buffer included in the buffer unit 140, for example in units of the data width M via the buffer control unit 135. The reading cache 152 can then divide the read data having the data width M into pieces of data each having a data width smaller than the data width M, and can output the pieces of data to the encoding core unit 154.

In some implementations, the encoding core unit 154 encodes the data. The encoding core unit 154 can encode the data received from the reading cache 152 by using the encoding method determined by the encoding method determining unit 165. The encoding core unit 154 can provide the encoded data to the writing cache 156. The writing cache 156 can combine pieces of data which are received one at a time from the encoding core unit 154, and then write the data into the buffer included in the buffer unit 140 in units of the data width M. In some implementations, the writing cache 156 provides the data received from the encoding core unit 154 to the error check code generating unit 145.

Figure 4:
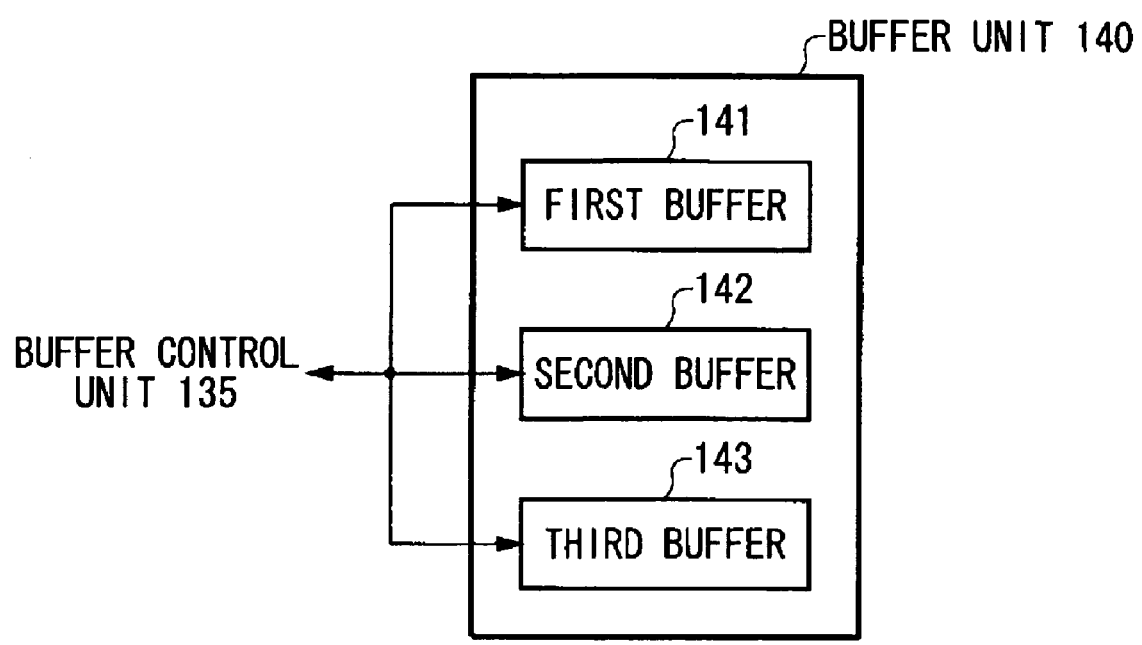
FIG. 4 is a block diagram showing a functional configuration of a buffer unit 140.

FIG. 4 shows an example of a functional configuration of the buffer unit 140. The buffer unit 140 here includes therein a first buffer 141, a second buffer 142 and a third buffer 143. One or more of the first, second and third buffers 141, 142 and 143 can be controlled by the buffer control unit 135 so as to store data thereon. As another example, the first, second and third buffers 141, 142 and 143 can be controlled by the buffer control unit 135 so as to provide data to the buffer control unit 135. One or more of the first, second and third buffers 141, 142 and 143 can temporarily store thereon data to be written into at least one sector of the magnetic disk 20, where the data can be received from the interface 160. As another example, one or more of the first, second and third buffers 141, 142 and 143 can temporarily store encoded data corresponding to at least one sector.

For example, the first buffer 141 can store thereon the first write data which has been encoded by the encoding unit 150 and is to be written into the first sector of the magnetic disk 20, and the first error check code for the first write data which is generated by the error check code generating unit 145. More specifically, the first buffer 141 can store the first error check code onto successive storage areas, after storing the first write data which has been encoded by the encoding unit 150 onto successive storage areas.

In some implementations, the second buffer 142 stores thereon the second write data which has been encoded by the encoding unit 150 and is to be written into the second sector of the magnetic disk 20, and the second error check code for the second write data which is generated by the error check code generating unit 145. For example, the second buffer 142 can store thereon the second write data and second error check code which are to be written into the second sector subsequent to the first sector of the magnetic disk 20. For example, the second buffer 142 can store thereon the second write data and second error check code which are to be written into the second sector which is adjacent and subsequent to the first sector of the magnetic disk.

In some implementations, the third buffer 143 stores thereon the third write data which has been encoded by the encoding unit 150 and is to be written into the third sector of the magnetic disk 20, and the third error check code for the third write data which is generated by the error check code generating unit 145. For example, the third buffer 143 can store thereon the third write data and third error check code which are to be written into the third sector subsequent to the second sector of the magnetic disk 20. For example, the third buffer 143 can store thereon the third write data and third error check code which are to be written into the third sector which is adjacent and subsequent to the second sector of the magnetic disk 20.

When the buffer unit 140 is configured in the above-described manner in some implementations, the buffer control unit 135 controls, in a first period, the first write data and first error check code stored on the first buffer 141 to be written into the first sector of the magnetic disk 20, concurrently with controlling the second write data which has been encoded by the encoding unit 150 and the second error check code generated by the error check code generating unit 145 to be stored onto the second buffer 142. Here, the buffer control unit 135 may read and output, one at a time and alternately, portions of the first write data stored on the first buffer 141 and portions of the first error check code stored on the first buffer 141. The buffer control unit 135 can cause the output first write data and first error check code to be written into the first sector of the magnetic disk 20. The first error check code generated by the error check code generating unit 145 can, in some implementations, be stored on the first buffer 141 and written into the first sector of the magnetic disk 20 without being encoded.

In some implementations, when outputting the first error check code and first write data, the buffer control unit 135 may sequentially insert a predetermined amount of the first error check code into the first write data at predetermined intervals. For example, assume that the first write data has a data amount of 512 bytes. The buffer control unit 135 can partition the first error check code in units of 5 to 11 into pieces of data, for example, and can insert the pieces of data into the first write data when outputting the first write data and first error check code. If the first write data has a data amount of 1,024 bytes, the buffer control unit 135 in some implementations partitions the first error check code in units of 8 to 22 into pieces of data, for example, and can insert the pieces of data into the first write data when outputting the first write data and first error check code. In some implementations if the first write data has a data amount of 4,096 bytes, the buffer control unit 135 partitions the first error check code in units of 8 to 20 into pieces of data, for example, and can insert the pieces of data into the first write data when outputting the first write data and first error check code. In other implementations, one or more other numbers of units and/or other data amount(s) can be used.

In some implementations, the buffer control unit 135 controls, in the first period, the first write data and first error check code stored on the first buffer 141 to be written into the first sector of the magnetic disk, and controls the second write data which has been encoded by the encoding unit 150 and the second error check code generated by the error check code generating unit 145 to be stored onto the second buffer 142, concurrently with controlling the third write data which has not been encoded by the encoding unit 150 to be written into the third buffer 143. In a second period following the first period, the buffer control unit 135 can control the second write data and second error check code stored on the second buffer 142 to be written into the second sector of the magnetic disk 20, concurrently with controlling the third write data which has been encoded by the encoding unit 150 and the third error check code generated by the error check code generating unit 145 to be stored onto the third buffer 143, to replace the third write data which has not been encoded by the encoding unit 150.

In some implementations, concurrently with the buffer control unit 135 controlling the third write data which has not been encoded by the encoding unit 150 to be stored onto the third buffer 143, the encoding method determining unit 165 can receive the third write data and determine the encoding method to be used by the encoding unit 150 to encode the third write data. The encoding method determining unit 165 can determine the encoding method to be one of, for example, RZ method, RB method, NRZ method, PM method, PE method, FM method and the like. The encoding unit 150 can encode the data stored on the first and second buffers 141 and 142 into encoded data representing signals to be applied to the magnetic disk 20.

In the above-described case, while writing the data received from the interface 160 into at least one of the first and second buffers 141 and 142, the buffer control unit 135 can read data from the other buffer. Following this, in some implementations, the buffer control unit 135 uses the encoding unit 150 to encode the read data, and stores the encoded data into the other buffer. For example, the data width M between the encoding unit 150 and the first and second buffers 141 and 142 may be equal to or larger than twice the data width N between the interface 160 and the first and second buffers 141 and 142.

In some implementations, the reading cache 152 in the encoding unit 150 reads the data from the first and second buffers 141 and 142 in units of the data width M. The reading cache 152 can then divide the read data into pieces of data having a smaller data width than the data width M, and can output the pieces of data to the encoding core unit 154. Subsequently, the writing cache 156 can combine pieces of data which are respectively received on separate occasions from the encoding core unit 154. The writing cache 156 can then write the combined pieces of data in units of the data width M onto one of the first and second buffers 141 and 142.

In some implementations, the magnetic disk controller 10 is designed so that the sum of the data reading cycle from the first and second buffers 141 and 142 to the encoding unit 150 and the data writing cycle from the encoding unit 150 to the first and second buffers 141 and 142 is substantially equal to the data writing cycle from the interface 160 to the first and second buffers 141 and 142.

In some implementations, the writing control unit 110 reads the encoded data from the third buffer 143 and writes the read encoded data into the magnetic disk 20. For example, the magnetic disk controller 10 can be designed so that the sum of the data reading cycle from the first and second buffers 141 and 142 to the encoding unit 150 and the data writing cycle from the encoding unit 150 to the first and second buffers 141 and 142 is substantially equal to the data reading cycle from the third buffer 143 to the writing control unit 110.

In some implementations, the buffer control unit 135 controls the first buffer 141 to function in the same manner as the second buffer 142, controls the second buffer 142 to function in the same manner as the third buffer 143, and controls the third buffer 143 to function in the same manner as the first buffer 141. In this way, the buffer control unit 135 can use the first, second and third buffers 141, 142 and 143 in rotation in some implementations.

Figure 5:
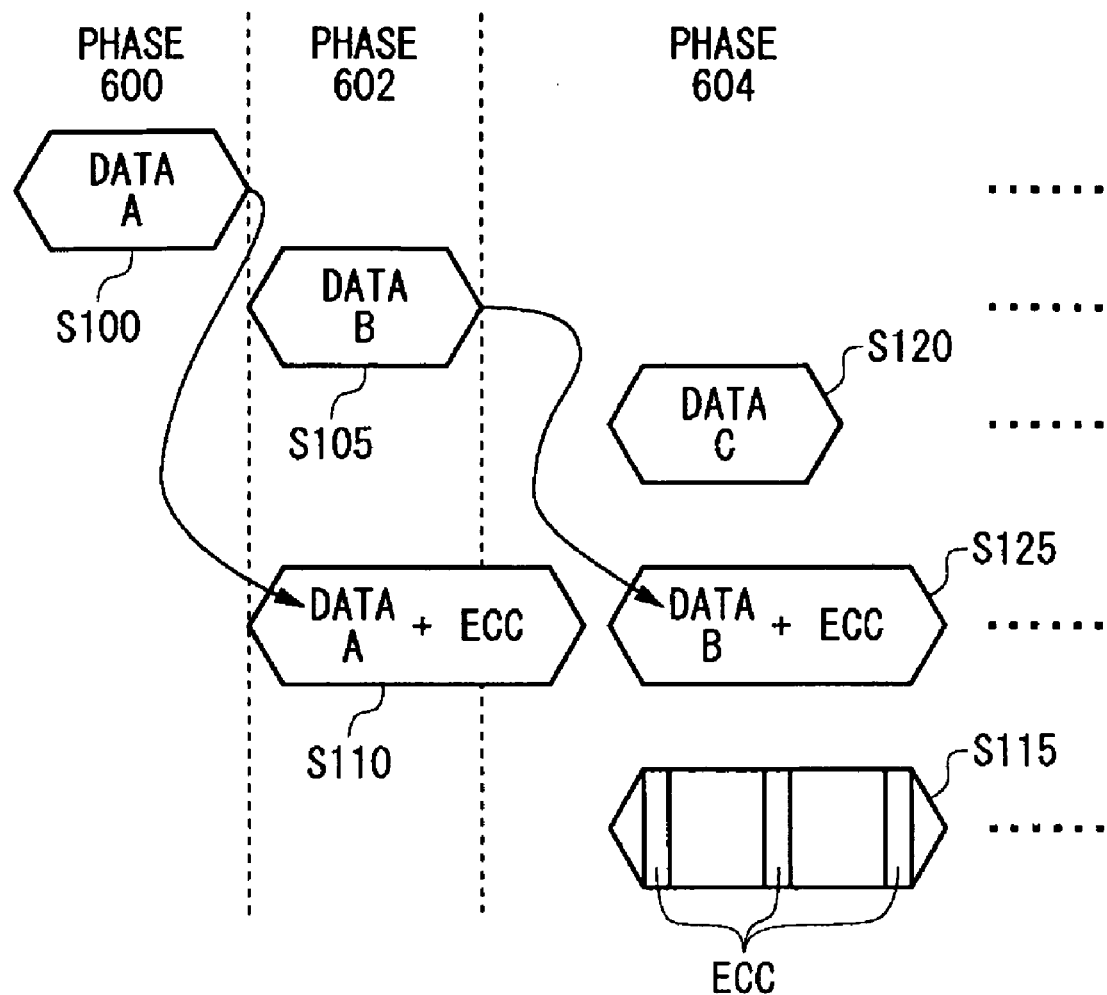
FIG. 5 shows writing of data into the magnetic disk 20.

FIG. 5 shows, as an example, writing of data into the magnetic disk 20 performed by, for example, the magnetic disk controller 10. To begin with, data (e.g. data A) can be stored onto the first buffer 141 in a phase 600 (S100). Subsequently, data (e.g. data B) can be stored onto the second buffer 142 in a phase 602 (S105). In synchronization with the timing at which the data is stored onto the second buffer 142, the data stored on the first buffer 141 can be encoded by the encoding unit 150, and then stored back onto the first buffer 141 (S110). Also, an error check code and/or error correction code can be generated by the error check code generating unit 145 for the data stored on the first buffer 141, and can be stored onto the first buffer 141 together with the encoded data (S110).

In a phase 604 following the phase 602, the error check code and/or error correction code stored on the first buffer 141 can be stored onto the magnetic disk 20 together with the data, in a state of being partitioned and inserted at predetermined intervals (S115). Meanwhile, data (e.g. data C) can be stored onto the third buffer 143 (S120). In synchronization with the timing at which the data is stored onto the third buffer 143, the data stored on the second buffer 142 can be encoded by the encoding unit 150, and stored back onto the second buffer 142 (S125). As another example, an error check code and/or error correction code can be generated by the error check code generating unit 145 for the data stored on the second buffer 142, and can be stored onto the second buffer 142 (S125).

Figure 6:
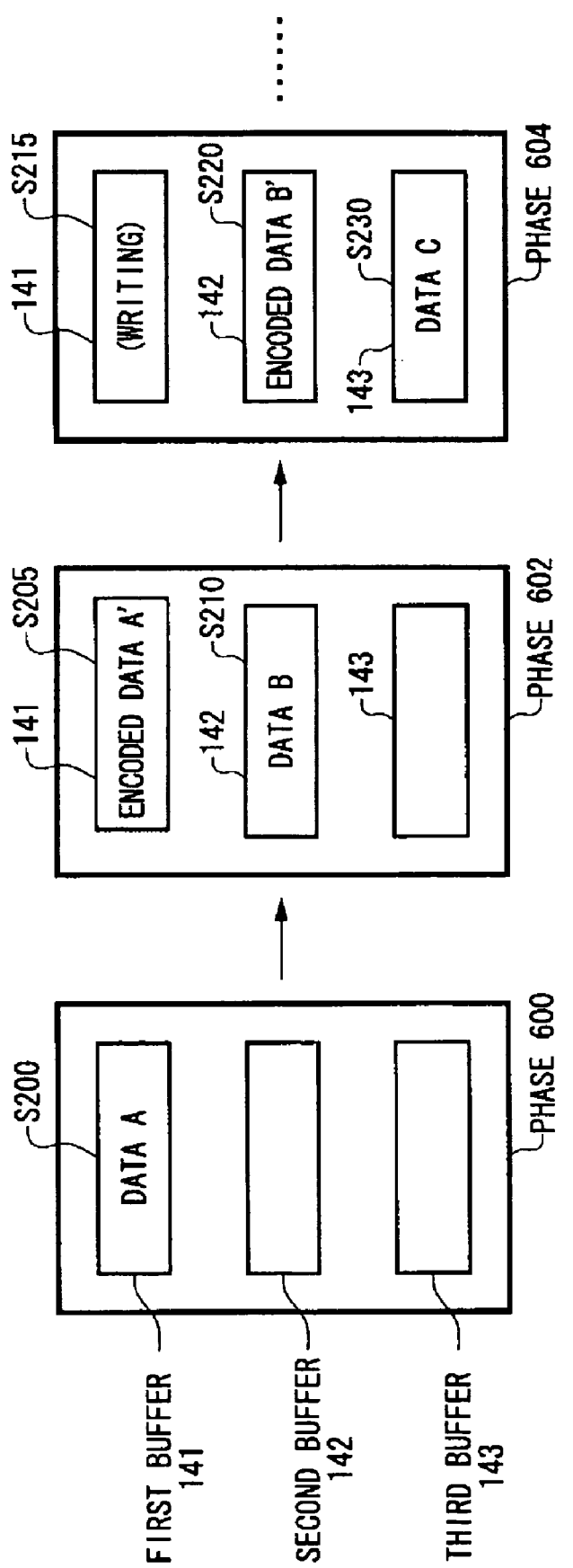
FIG. 6 shows writing of data into the magnetic disk 20.

FIG. 6 shows, as an example, writing of data into the magnetic disk 20 performed by, for example, the magnetic disk controller 10. To begin with, the buffer control unit 135, in some implementations, controls data (e.g. data A) to be stored onto the first buffer 141 in the phase 600 (S200). In the following phase 602, the data A stored on the first buffer 141 can be encoded by the encoding unit 150. The buffer control unit 135 can control the encoded data A' created by the encoding unit 150 to be stored onto the first buffer 141 (S205). In synchronization with the timing of storing the encoded data A' onto the first buffer 141, the buffer control unit 135 can control data (e.g. data B) to be stored onto the second buffer 142 (S210).

In the phase 604, the buffer control unit 135, in some implementations, controls the encoded data A' stored on the first buffer 141 to be written into the magnetic disk 20 (S215). As another example, the data B stored on the second buffer 142 can be encoded by the encoding unit 150. The buffer control unit 135 can control the encoded data B' created by the encoding unit 150 to be stored onto the second buffer 142 (S220). In synchronization with the timing of storing the encoded data B' onto the second buffer 142, the buffer control unit 135, in some implementations controls data (e.g. data C) to be stored onto the third buffer 143 (S230).

Figure 7:
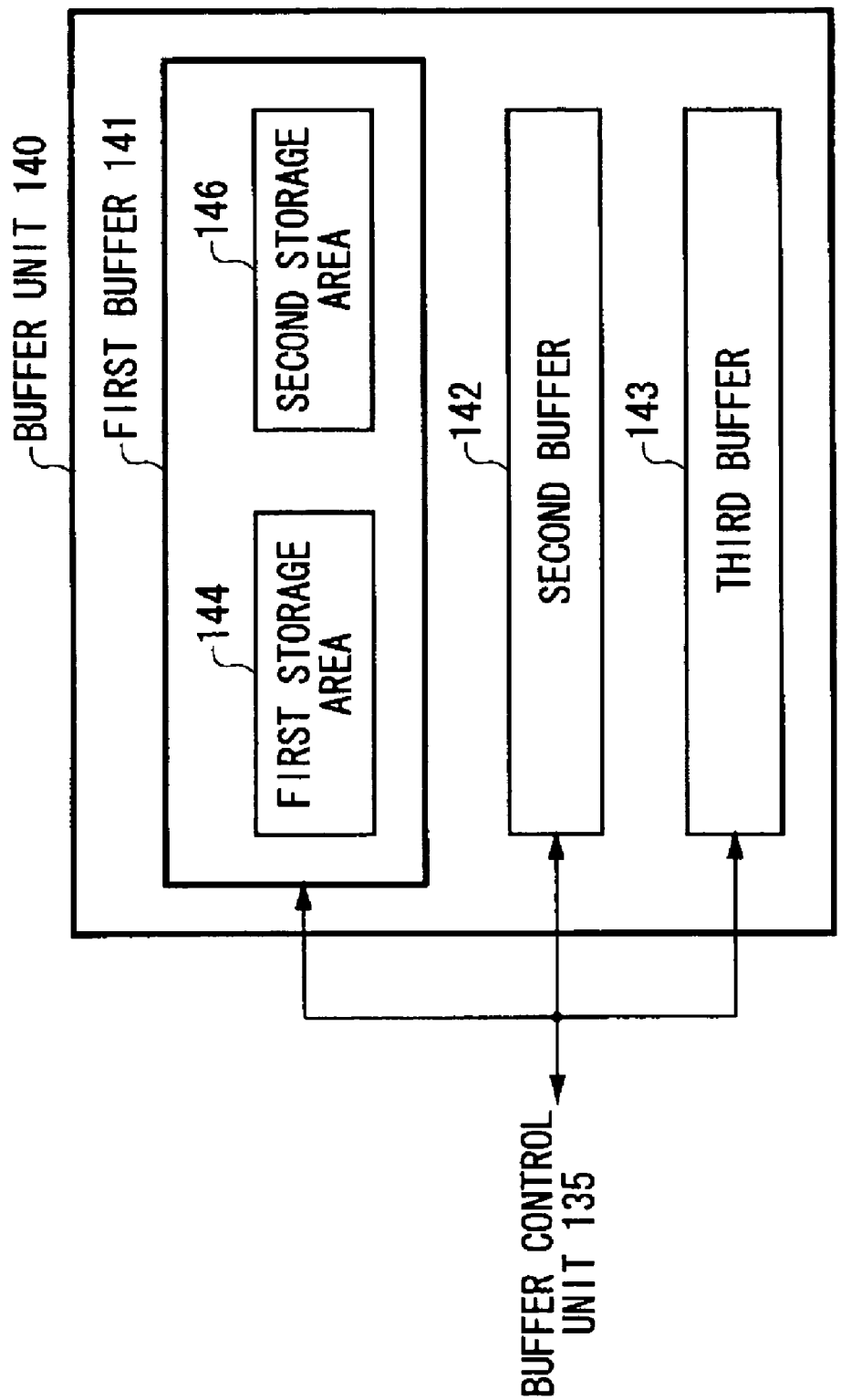
FIG. 7 is a block diagram showing a functional configuration of the buffer unit 140.

FIG. 7 shows an example of a functional configuration of the buffer unit 140. The buffer unit 140 here includes therein the first, second and third buffers 141, 142 and 143. The first buffer 141 here includes therein a first storage area 144 and a second storage area 146.

In some implementations, the first buffer 141 includes therein the first storage area 144 for sequentially storing former half data, out of former half data and latter half data constituting each of a plurality of pieces of write data to be written into the plurality of sectors of the magnetic disk 20. As another example, the first buffer 141 includes therein the second storage area 146 for sequentially storing the latter half data included in each of the plurality of pieces of write data. In some implementations, as long as the sum of the data amount of the former half data and the data amount of the latter half data is equal to the data amount of data to be written into each sector, the data amount of the former half data and the data amount of the latter half data may be designed different from each other.

In some implementations, the first buffer 141 stores former half data received from the buffer control unit 135 onto the first storage area 144. After this, the first buffer 141 can store latter half data received from the buffer control unit 135 onto the second storage area 146. Concurrently with the latter half data of the first write data to be written into the first sector of the magnetic disk 20 is being stored onto the second storage area 146, the encoding unit 150 can receive, from the buffer control unit 135, the former half data of the first write data, which may have been stored on the first storage area 144. Subsequently, the encoding unit 150 can encode the received former half data into data representing a signal to be applied to the magnetic disk 20.

In some implementations the second buffer 142 receives the former half data of the first write data, which has been encoded by the encoding unit 150, from the buffer control unit 135 and stores the former half data thereon. After storing thereon the former half data and latter half data of the first write data which have been encoded by the encoding unit 150, the second buffer 142 can receive the first error check code for the first write data, which is generated by the error check code generating unit 145, from the buffer control unit 135, and can store thereon the first error check code. For example, after receiving the first write data including the former half data and latter half data which have been encoded by the encoding unit 150 from the buffer control unit 135 and storing the first write data onto successive storage areas, the second buffer 142 can store the first error check code onto successive storage areas.

In some implementations, the buffer control unit 135 controls the former half data of the first write data which is stored on the second buffer 142 to be written into the first sector of the magnetic disk 20. For example, concurrently with the former half data of the second write data to be written into the second sector of the magnetic disk 20 being stored onto the first storage area 144, the encoding unit 150 can receive the latter half data of the first write data, which has been stored on the second storage area 146, from the buffer control unit 135, and encodes the latter half data. After storing thereon the former half data of the first write data, the second buffer 142 stores thereon the latter half data of the first write data which has been encoded by the encoding unit 150.

Following this, after controlling the former half data of the first write data to be written into the magnetic disk 20, the buffer control unit 135, in some implementations, controls the latter half data of the first write data, which is stored on the second buffer 142, to be written into the first sector of the magnetic disk 20. For example, along with the former half data and latter half data of the first write data, the buffer control unit 135 can controls the first error check code which is stored on the second buffer 142 to be written into the first sector of the magnetic disk 20. For example, the buffer control unit 135 can read and output, one at a time and alternately, portions of the first write data and first error check code which are stored on the second buffer 142. Then, the buffer control unit 135 controls the output first write data and first error check code to be written into the first sector of the magnetic disk 20.

In this case, the first error check code generated by the error check code generating unit 145 may in some implementations be stored onto the second buffer 142 and written into the first sector of the magnetic disk 20 without being encoded. When outputting the first error check code and first write data, the buffer control unit 135 may insert a predetermined data amount of the first error check code into the first write data at predetermined intervals.

Concurrently with the latter half data of the second write data being stored onto the second storage area 146, the encoding unit 150 can receive the former half data of the second write data which has been stored on the first storage area 144 from the buffer control unit 135 and encodes the former half data. After this, concurrently with the former half data of the third write data to be written onto the third sector of the magnetic disk 20 being stored onto the first storage area 144, the encoding unit 150 can encode the latter half data of the second write data which has been stored on the second storage area 146.

After receiving the former half data of the second write data which has been encoded by the encoding unit 150 from the buffer control unit 135 and storing the former half data, the third buffer 143 in some implementations receives the latter half data of the second write data which has been encoded by the encoding unit 150 from the buffer control unit 135 and stores the latter half data. Subsequently, after controlling the first write data which is stored on the second buffer 142 to be written into the first sector, the buffer control unit 135 can control the second write data which is stored on the third buffer 143 to be written into the second sector.

The encoding method determining unit 165 in some implementations determines encoding methods to be used by the encoding unit 150 to encode the plurality of pieces of write data to be written into the plurality of sectors of the magnetic disk 20, for example, so that each of the encoding methods corresponds to the former half data or latter half data of a corresponding one of the plurality of pieces of write data. For example, concurrently with the former half data of the first write data being stored onto the first storage area 144, the encoding method determining unit 165 can receive the former half data of the first write data, and determine the encoding method to be used by the encoding unit 150 to encode the former half data of the first write data. As another example, concurrently with that the latter half data of the first write data is being stored onto the second storage area 146, the encoding method determining unit 165 can receive the latter half data of the first write data, and can determine the encoding method to be used by the encoding unit 150 to encode the latter half data of the first write data.

Figure 8:
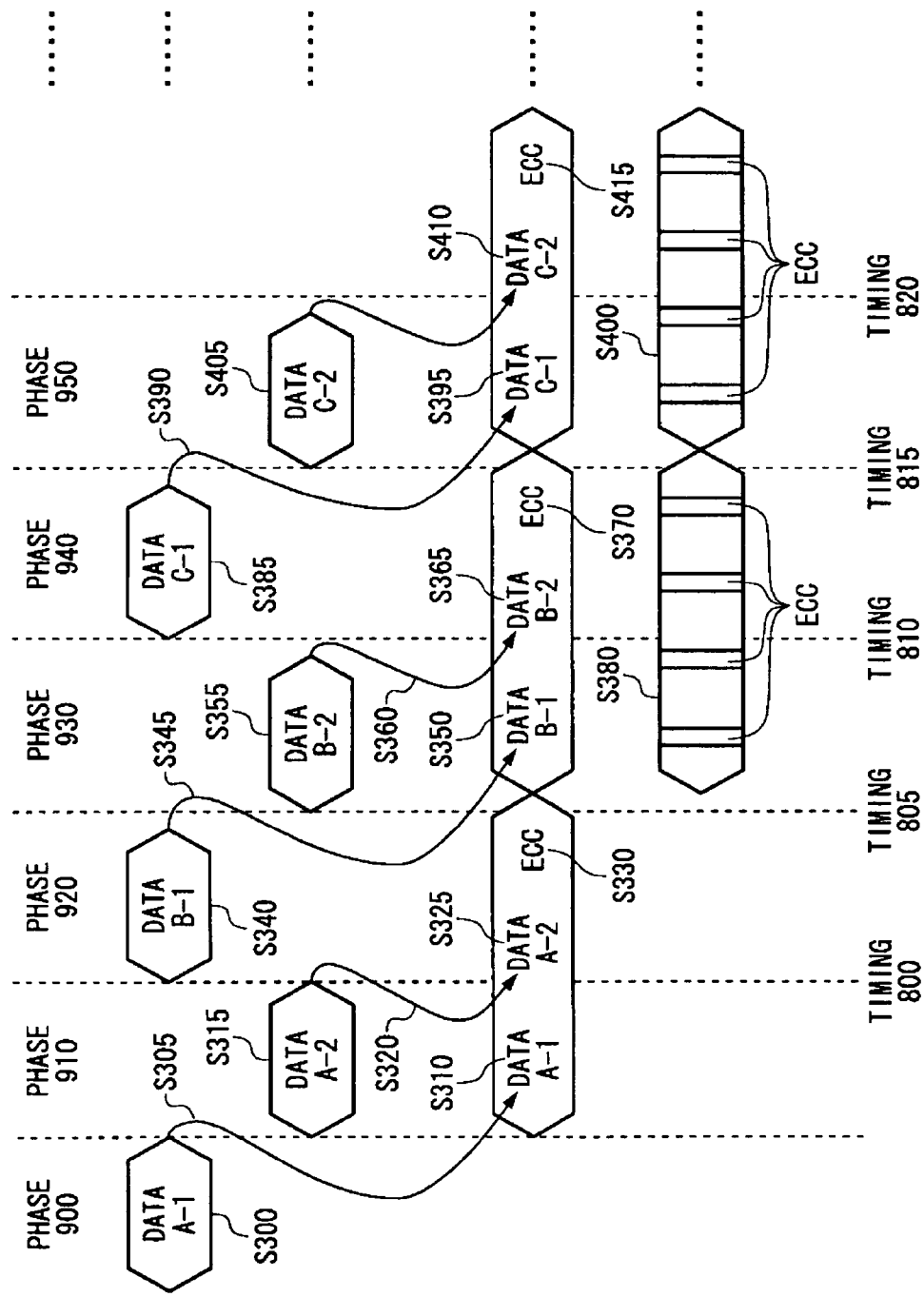
FIG. 8 shows writing of data into the magnetic disk 20.

FIG. 8 shows, as an example, writing of data into the magnetic disk 20 that can be performed by, for example, the magnetic disk controller 10. To begin with, in a phase 900, the buffer control unit 135 can store former half data (e.g. data A-1) onto the first storage area 144 (S300). In the following phase 910, the buffer control unit 135 can control the data A-1 which is stored on the first storage area 144 to be encoded by the encoding unit 150, and can control the encoded data A-1 to be stored onto the second buffer 142 (S305 and S310). For example, the buffer control unit 135 can control the encoded data A-1 to be provided from the encoding unit 150 to the error check code generating unit 145.

In some implementations, in the phase 910, the buffer control unit 135 controls latter half data (e.g. data A-2, where the data A-1 and data A-2 together form one piece of data A) to be stored onto the second storage area 146 (S315). At a timing 800 between the phase 910 and a phase 920, the buffer control unit 135 can control the data A-2 which is stored on the second storage area 146 to be encoded by the encoding unit 150, and can control the encoded data A-2 to be stored onto the second buffer 142 (S320 and S325). As another example, the buffer control unit 135 can control the encoded data A-2 to be provided from the encoding unit 150 to the error check code generating unit 145.

In the following phase 920, the buffer control unit 135 in some implementations can control data B-1, which can be a different former half data than the data A-1, to be stored onto the first storage area 144 (S340). Meanwhile, the error check code generating unit 145 can generate an error check code and/or error correction code based on the encoded data A-1 and data A-2. The buffer control unit 135 can store the error check code and/or error correction code generated by the error check code generating unit 145 into the second buffer 142 (S330).

At a timing 805 between the phase 920 and a phase 930, the buffer control unit 135 in some implementations stores data B-2 (the data B-1 and data B-2 together form one piece of data B), which can be a different latter half data than the data A-2, onto the second storage area 146 (S355). Meanwhile, the buffer control unit 135 in some implementations controls the data B-1 which is stored on the first storage area 144 to be encoded by the encoding unit 150, and controls the encoded data B-1 to be stored onto the second buffer 142 (S345 and S350). As another example, the buffer control unit 135 can control the encoded data B-1 to be provided from the encoding unit 150 to the error check code generating unit 145.

At the timing 805, before storing the encoded data B-1 onto the second buffer 142, the buffer control unit 135 in some implementations controls the encoded data A-1 and A-2 and the error correction code and/or error check code which is generated based on the encoded data A-1 and A-2, which may all be stored on the second buffer 142, to be output and written onto the magnetic disk 20. In this case, the buffer control unit 135 can partition the error check code and/or error correction code into pieces of data and can write the pieces of data into a writing area of the magnetic disk 20 at predetermined intervals (S380).

Subsequently, at a timing 810 between the phase 930 and a phase 940, the buffer control unit 135 in some implementations controls the data B-2 which is stored on the second storage area 146 to be encoded by the encoding unit 150, and controls the encoded data B-2 to be stored onto the second buffer 142 (S360 and S365). The buffer control unit 135 can also control the encoded data B-2 to be provided from the encoding unit 150 to the error check code generating unit 145. As another example, the buffer control unit 135 can store data C-1, which can be a different former half data than the data A-1 and data B-1, onto the first storage area 144 at the timing 810 (S385).

In the phase 940, the error check code generating unit 145 in some implementations generates an error check code and/or error correction code based on the encoded data B-1 and encoded data B-2. The buffer control unit 135 can store the error check code and/or error correction code which is generated by the error check code generating unit 145 onto the second buffer 142 (S370).

In some implementations, at a timing 815 between the phase 940 and a phase 950, the buffer control unit 135 stores data C-2 (the data C-1 and data C-2 together form one piece of data C), which can be a different latter half data than the data A-2 and data B-2, onto the second storage area 146 (S405). Meanwhile, the buffer control unit 135 can control the data C-1 which is stored on the first storage area 144 to be encoded by the encoding unit 150, and can control the encoded data C-1 to be stored onto the second buffer 142 (S390 and S395). As another example, the buffer control unit 135 can control the encoded data C-1 to be provided from the encoding unit 150 to the error check code generating unit 145.

In some implementations, before storing the encoded data C-1 onto the second buffer 142, the buffer control unit 135 can control the encoded data B-1 and B-2 and the error correction code and/or error check code which is generated based on the encoded data B-1 and B-2, which are all stored on the second buffer 142, to be output and written into the magnetic disk 20. For example, the buffer control unit 135 can partition the error check code and/or error correction code into pieces of data and write the pieces of data into a writing area of the magnetic disk 20 at predetermined intervals (S400).

In some implementations, at a timing 820 between the phase 950 and the next phase, the buffer control unit 135 controls the data C-2 which is stored on the second storage area 146 to be encoded by the encoding unit 150, and can control the encoded data C-2 to be stored onto the second buffer 142 (S410). For example, the buffer control unit 135 can control the encoded data C-2 to be provided from the encoding unit 150 to the error check code generating unit 145. Here, in the phase subsequent to the phase 950, the error check code generating unit 145 can generate an error check code and/or error correction code based on the encoded data C-1 and encoded data C-2. The buffer control unit 135 can store the error check code and/or error correction code generated by the error check code generating unit 145 onto the second buffer 142 (S415).

In some implementations, the magnetic disk controller 10 divides one piece of data into former half data and latter half data, and encodes each of the former half data and latter half data. For example, the magnetic disk controller 10 can partition an error check code and/or error correction code, which can be generated based on the encoded former half data and encoded latter half data, into pieces of data, and can store the pieces of data onto the magnetic disk 20 at predetermined intervals.

Figure 9:
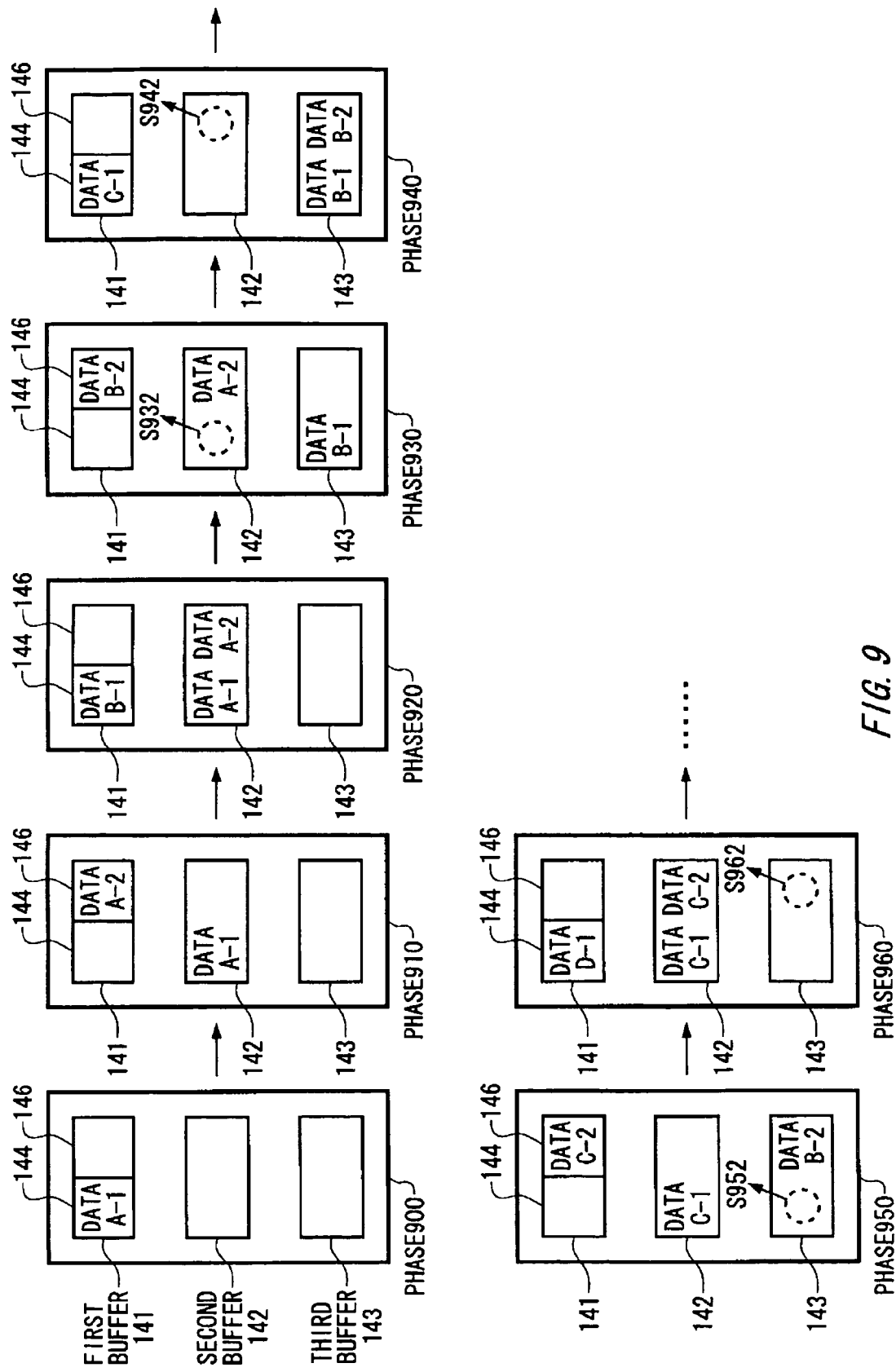
FIG. 9 shows writing of data into the magnetic disk 20.

FIG. 9 shows, as an example, writing of data into the magnetic disk 20 that can be performed by, for example, the magnetic disk controller 10. To begin with, in a phase 900, the buffer control unit 135 can store data A-1, which is part of data A, onto the first storage area 144 in the first buffer 141. In a phase 910, the buffer control unit 135 can control the data A-1 stored on the first storage area 144 to be encoded by the encoding unit 150, and can store the encoded data A-1 onto the second buffer 142. In some implementations, the buffer control unit 135 controls the encoded data A-1 to be provided to the error check code generating unit 145. The buffer control unit 135 can store data A-2, which is the remaining portion of the data A, onto the second storage area 146 in the first buffer 141.

Subsequently in a phase 920, the buffer control unit 135 in some implementations stores data B-1, which is part of data B, onto the first storage area 144. The buffer control unit 135 can control the data A-2 stored on the second storage area 146 to be encoded by the encoding unit 150, and can store the encoded data A-2 onto the second buffer 142. The buffer control unit 135 can control the encoded data A-2 to be provided to the error check code generating unit 145. The error check code generating unit 145 can generate an error check code and/or error correction code for the data A based on the encoded data A-1 and encoded data A-2. The buffer control unit 135 can store the error check code and/or error correction code which is generated by the error check code generating unit 145 onto the second buffer 142.

In a phase 930, the buffer control unit 135 in some implementations stores data B-2, which is the remaining portion of the data B, onto the second storage area 146. In some implementations, the buffer control unit 135 controls the data B-1 which is stored on the first storage area 144 to be encoded by the encoding unit 150, and can store the encoded data B-1 onto the third buffer 143. The buffer control unit 135 can control the encoded data B-1 to be provided to the error check code generating unit 145. In the phase 930, the buffer control unit 135 in some implementations provides the encoded data A-1, which is stored on the second buffer 142, to the writing control unit 110. The writing control unit 110 can write the encoded data A-1 into the magnetic disk 20 (S932).

In the following phase 940, the buffer control unit 135 in some implementations stores data C-1, which is part of data C, onto the first storage area 144. The buffer control unit 135 can provide the encoded data A-2, which is stored on the second buffer 142, to the writing control unit 110. The writing control unit 110 can write the encoded data A-2 into the magnetic disk 20 (S942). In some implementations, the writing control unit 110 writes the error check code and/or error correction code for the data A, which is stored on the second buffer 142, into the magnetic disk 20.

In some implementations, the buffer control unit 135 controls the data B-2 which is stored on the second storage area 146 to be encoded by the encoding unit 150, and can store the encoded data B-2 onto the third buffer 143. The buffer control unit 135 can provide the encoded data B-2 to the error check code generating unit 145. The error check code generating unit 145 can generate an error check code and/or error correction code for the data B, based on the encoded data B-1 and encoded data B-2. The buffer control unit 135 can store the error check code and/or error correction code, which is generated by the error check code generating unit 145, onto the third buffer 143.

In a phase 950, the buffer control unit 135 in some implementations stores data C-2, which is the remaining portion of the data C, onto the second storage area 146. The buffer control unit 135 can control the data C-1 which is stored on the first storage area 144 to be encoded by the encoding unit 150, and can store the encoded data C-1 onto the second buffer 142. The buffer control unit 135 can provide the encoded data C-1 to the error check code generating unit 145. In the phase 950, the buffer control unit 135 in some implementations provides the encoded data B-1 which is stored on the third buffer 143 to the writing control unit 110. The writing control unit 110 can write the encoded data B-1 into the magnetic disk 20 (S952).

Subsequently in the following phase 960, the buffer control unit 135 in some implementations stores data D-1, which is part of data D, onto the first storage area 144. The buffer control unit 135 can provide the encoded data B-2 which is stored on the third buffer 143 to the writing control unit 110. The writing control unit 110 can write the encoded data B-2 into the magnetic disk 20 (S962). In this case, the writing control unit 110 can write the error check code and/or error correction code for the data B, which is stored on the third buffer 143, into the magnetic disk 20.

In some implementations, the buffer control unit 135 controls the data C-2 which is stored on the second storage area 146 to be encoded by the encoding unit 150, and can store the encoded data C-2 onto the second buffer 142. The buffer control unit 135 can provide the encoded data C-2 to the error check code generating unit 145. The error check code generating unit 145 can generate an error check code and/or error correction code for the data C, based on the encoded data C-1 and encoded data C-2. The buffer control unit 135 can store the error check code and/or error correction code, which is generated by the error check code generating unit 145, onto the second buffer 142.

While the embodiments of the present invention have been described, the technical scope of the invention is not limited to the above described embodiments. It is apparent to persons skilled in the art that various alternations and improvements can be added to the above-described embodiments. It is also apparent from the scope of the claims that the embodiments added with such alternations or improvements can be included in the technical scope of the invention.

For example, some embodiments of the present invention can write data and an error check code into a magnetic disk immediately after generating the error check code based on the data.

A number of embodiments have been described. Nevertheless, it will be understood that various modifications may be made without departing from the spirit and scope of this disclosure. Accordingly, other embodiments are within the scope of the following claims.

What is claimed is:

1. A magnetic disk controller comprising:
an index detecting unit that detects an index of a magnetic disk;
an error check code generating unit that, after the index detecting unit detects the index, generates a first error check code for a first write data based on the first write data and on a first physical address of a first sector subsequent to the detected index; and
a writing control unit that causes the first error check code, the first write data and the first physical address to be written into a second sector subsequent to the first sector.

2. The magnetic disk controller according to claim 1, wherein:
the first sector is adjacent to the detected index; and
the second sector is adjacent to the first sector on a side opposite from the detected index.

3. The magnetic disk controller according to claim 1, further comprising:
an address generating unit that sequentially generates a physical address of a sector in accordance with an elapsed time from when the index detecting unit detects the index;
wherein the first physical address of the first sector is generated by the address generating unit.

4. The magnetic disk controller according to claim 3, wherein
the error check code generating unit further generates a second error check code for second write data based on the second write data and on a second physical address of the second sector which is generated by the address generating unit; and
the writing control unit further causes the second error check code, the second write data and the second physical address to be written into a third sector subsequent to the second sector.

5. The magnetic disk controller according to claim 4, wherein the third sector is adjacent to the second sector on a side opposite from the first sector.

6. The magnetic disk controller according to claim 1, further comprising:
an address obtaining unit to obtain a physical address representing a sector on which read data is stored;
an address adding unit to add a predetermined value to the physical address obtained by the address obtaining unit; and
a reading control unit to cause data to be read from a sector represented by a physical address generated as a result of the addition performed by the address adding unit.

7. The magnetic disk controller according to claim 6, wherein the predetermined value is one.

8. A method of controlling writing of data into a magnetic disk, comprising:
detecting an index of a magnetic disk;
generating, after the index is detected, a first error check code for first write data based on first write data and on a first physical address of a first sector subsequent to the detected index; and
causing the generated first error check code, the first write data and the first physical address to be written into a second sector subsequent to the first sector.

9. The method according to claim 8, wherein:
the first sector is adjacent to the detected index; and
the second sector is adjacent to the first sector on a side opposite from the detected index.

10. The method according to claim 8, further comprising:
sequentially generating the first physical address of the first sector in accordance with an elapsed time from when the index is detected.

11. The method according to claim 10, further comprising:
generating a second physical address of the second sector;
generating a second error check code for second write data based on the second write data and on the second physical address of the second sector; and causing the second error check code, the second write data and the second physical address to be written into a third sector subsequent to the second sector.

12. The method according to claim 11, wherein the third sector is adjacent to the second sector on a side opposite from the first sector.

13. The method according to claim 8, further comprising:
obtaining a physical address representing a sector on which read data is stored;
adding a predetermined value to the obtained physical address to form a new physical address; and
causing data to be read from a sector represented by the new physical address.

14. The method according to claim 13, wherein the predetermined value is one.

15. A magnetic disk controller comprising:
means for detecting an index of a magnetic disk;
means for generating, after the index is detected, a first error check code for first write data based on the first write data and on a first physical address of a first sector subsequent to the detected index; and
means for causing the generated first error check code, the first write data and the first physical address to be written into a second sector subsequent to the first sector.

16. A method comprising:
determining a first physical address of a magnetic disk to which first data is to be written;
generating a first error check code based on the first data and the first physical address; and
writing the first physical address, the first error check code and the first data to the magnetic disk immediately after generating the first error check code.

17. The method according to claim 16, wherein:
writing the first physical address, the first error check code and the first data is performed prior to a head of the magnetic disk re-aligning with a previous position on the magnetic disk.

18. The method according to claim 17, wherein:
the previous position is where the head was located when the first error check code was generated.

19. The method according to claim 16, wherein the first physical address is associated with a first sector on the magnetic disk, and wherein the first physical address, the first error check code and the first data are written to a second sector on the magnetic disk associated with a second physical address, the method further comprising:
obtaining the first physical address as a location for reading the first data;
converting the first physical address to the second physical address; and
reading the first data from the second sector using the second physical address.

20. The method according to claim 19, wherein the conversion comprises adding a predetermined value to the first physical address.

* * * * *